US012713173B2

(12) United States Patent
Elghannai et al.

(10) Patent No.: US 12,713,173 B2
(45) Date of Patent: Aug. 18, 2026

(54) ANTENNA DESIGNS FOR HEARING INSTRUMENTS

(71) Applicant: Starkey Laboratories, Inc., Eden Prairie, MN (US)

(72) Inventors: Ezdeen Elghannai, Eden Prairie, MN (US); Thaddeus Hoffman, Mounds View, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 147 days.

(21) Appl. No.: 18/771,575

(22) Filed: Jul. 12, 2024

(65) Prior Publication Data

US 2024/0365044 A1 Oct. 31, 2024

Related U.S. Application Data

(63) Continuation of application No. 17/657,070, filed on Mar. 29, 2022, now Pat. No. 12,069,421, which is a (Continued)

(51) Int. Cl.
*H04R 1/10* (2026.01)
*H04W 4/80* (2018.01)

(52) U.S. Cl.
CPC ......... *H04R 1/1041* (2013.01); *H04R 1/1058* (2013.01); *H04R 2420/07* (2013.01); *H04W 4/80* (2018.02)

(58) Field of Classification Search
CPC .... H04R 25/505; H04R 25/65; H04R 1/1066; H04R 2225/025; H04R 2420/03;

(Continued)

(56) References Cited

U.S. PATENT DOCUMENTS 5,159,347 A 10/1992 Osterwalder
5,721,783 A 2/1998 Anderson (Continued)

FOREIGN PATENT DOCUMENTS

CN 106102831 B 8/2019
EP 2680366 B1 1/2014

(Continued)

OTHER PUBLICATIONS

Communication pursuant to Article 94(3) EPC from counterpart European Application No. 20793497.7 dated Aug. 25, 2025, 4 pp.

(Continued)

*Primary Examiner* — Lun-See Lao
(74) *Attorney, Agent, or Firm* — Shumaker & Sieffert, P.A.

(57) ABSTRACT

An antenna for a hearing instrument is connected to a first feedline segment extending laterally along an inner posterior surface of a shell of the hearing instrument. The antenna is also connected to a second feedline segment extending laterally along the inner posterior surface of the shell. The antenna comprises a first arm connected to the first feedline segment. The first arm initially extends in an inferior direction along the inner posterior surface of the shell from the first feedline segment. A second arm is connected to the second feedline segment and initially extends in a superior direction along the inner lateral surface of the shell from the second feedline segment.

12 Claims, 15 Drawing Sheets

Related U.S. Application Data continuation of application No. PCT/US2020/053246, filed on Sep. 29, 2020.

(60) Provisional application No. 62/909,023, filed on Oct. 1, 2019.

(58) Field of Classification Search

CPC ......................... H04R 2420/05; H04R 25/305; H04R 25/554; H04R 25/602; H04R 25/658; H04R 1/1025; H04R 1/1041; H04R 1/1058; H04R 2225/31; H04R 2225/51; H04R 2225/57; H04R 2420/07; H04R 2460/17; H04R 25/55; H04R 25/603; H04R 25/604; H04R 25/609; H04R 25/652; A61B 1/227; G09B 23/28; G09B 23/34; H01Q 1/2291; H01Q 1/273; H01Q 9/26; H02J 50/005; H02J 50/10; H02J 7/731; H02J 7/751; H04W 4/80

USPC ............................................ 381/74, 312–314

See application file for complete search history.

(56) References Cited

U.S. PATENT DOCUMENTS 7,256,747 B2 8/2007 Victorian et al.
7,446,720 B2 11/2008 Victorian et al.
7,593,538 B2 9/2009 Polinske
8,675,902 B2 3/2014 Christensen et al.
9,167,360 B2 10/2015 Polinske et al.
9,525,930 B2 12/2016 Parkins
9,609,443 B2 3/2017 Ruaro et al.
9,968,781 B2 5/2018 Roehrlein et al.
9,972,895 B2 5/2018 Hirsch et al.
10,051,388 B2 8/2018 Polinske et al.
10,187,734 B2 1/2019 Kvist et al.
10,362,410 B2 7/2019 Ozden
10,406,372 B2 9/2019 Roehrlein et al.
10,547,957 B1 1/2020 Elghannai et al.
10,764,666 B1 9/2020 Napoles et al.
11,057,723 B2 7/2021 Elghannai et al.
11,323,833 B2 5/2022 Polinske et al.
11,785,400 B2 10/2023 Elghannai et al.
12,069,421 B2 * 8/2024 Elghannai ............ H04R 25/554
2005/0203584 A1 9/2005 Twetan et al.
2013/0342407 A1 12/2013 Kvist et al.
2013/0343586 A1 12/2013 Kvist et al.
2014/0307904 A1 * 10/2014 Polinske ................ H04R 25/65 381/323
2015/0289062 A1 * 10/2015 Ungstrup ............ H04R 25/554 381/314
2016/0050502 A1 * 2/2016 Kvist .................. H04R 25/554 381/315
2016/0330552 A1 11/2016 Flood
2017/0026762 A1 * 1/2017 Ruaro .................... H01Q 1/521
2017/0062913 A1 3/2017 Hirsch et al.
2017/0150278 A1 5/2017 Ruaro
2018/0084351 A1 3/2018 Polinske et al.
2018/0124528 A1 5/2018 Polinske et al.
2018/0138584 A1 5/2018 Leung et al.
2018/0242074 A1 8/2018 Xu et al.
2018/0352345 A1 12/2018 Polinske et al.
2018/0359575 A1 12/2018 Thaysen
2019/0006757 A1 1/2019 Nikles et al.
2019/0069101 A1 2/2019 Kvist
2019/0165456 A1 5/2019 Elghannai
2019/0349694 A1 11/2019 Farmakidis et al.
2020/0107141 A1 4/2020 Kvist et al.
2020/0335856 A1 10/2020 Kim et al.
2021/0067859 A1 * 3/2021 Sakane ................ H04R 1/1058
2021/0260389 A1 8/2021 Dubey et al.
2023/0387575 A1 11/2023 Elghannai et al.
2023/0412992 A1 12/2023 Elghannai et al.

FOREIGN PATENT DOCUMENTS

EP 2897385 A1 7/2015
EP 2983379 A2 2/2016
EP 3174314 A1 5/2017
EP 3531718 A1 8/2019
EP 3554096 A1 10/2019
JP 2002111352 A 4/2002
JP 2017147566 A 8/2017
JP 2018519739 A 7/2018
WO 2015147772 A1 10/2015
WO 2018114063 A1 6/2018
WO 2019035561 A1 2/2019
WO 2019130843 A1 7/2019
WO 2020132542 A1 6/2020

OTHER PUBLICATIONS

Communication pursuant to Article 94(3) EPC from counterpart European Application No. 20793497.7 dated Nov. 7, 2023, 5 pp.
International Preliminary Report on Patentability from International Application No. PCT/US2020/053246, dated Apr. 14, 2022, 10 pp.
International Search Report and Written Opinion of International Application No. PCT/US2020/053246 dated Dec. 4, 2020, p. 75.
Kammersgaard et al., “Body-Worn Spiral Monopole Antenna for Body-Centric Communications,” Proceedings of the 2015 International Workshop on Antenna Technology, Mar. 4-6, 2015, 4 pp.
Prosecution History from U.S. Appl. No. 17/657,070, now issued U.S. Pat. No. 12,069,421, dated Mar. 29, 2022 through May 30, 2024, 39 pp.
Response to Communication pursuant to Article 94(3) EPC dated Aug. 25, 2025, from counterpart European Application No. 20793497.7 filed Dec. 8, 2025, 39 pp.

* cited by examiner

ANTENNA DESIGNS FOR HEARING INSTRUMENTS

This application is a continuation of U.S. patent application Ser. No. 17/657,070, filed Mar. 29, 2022, which is a continuation of International Application No. PCT/US2020/053246, filed Sep. 29, 2020, which claims the benefit of U.S. Provisional Patent Application 62/909,023, filed Oct. 1, 2019, the entire contents of which are incorporated by reference herein.

TECHNICAL FIELD

This disclosure relates to hearing instruments.

BACKGROUND

Hearing instruments are devices designed to be worn on, in, or near one or more of a user's ears. Common types of hearing instruments include hearing assistance devices (e.g., "hearing aids"), earbuds, headphones, hearables, cochlear implants, and so on. In some examples, a hearing instrument may be implanted or integrated into a user. Some hearing instruments include additional features beyond just environmental sound-amplification. For example, some modern hearing instruments include advanced audio processing for improved device functionality, controlling and programming the devices, and beamforming, and some can even communicate wirelessly with external devices including other hearing instruments (e.g., for streaming media).

SUMMARY

This disclosure describes antenna designs for hearing instruments. There are a number of challenges faced by designers of antennas for hearing instruments. For example, because hearing instruments are primarily worn within the ear canals of users and because all functional components of hearing instruments are typically located within the hearing instruments themselves, the space available for antennas is limited. Also, because the functional components of hearing instruments are typically located within the hearing instruments themselves, the batteries of hearing instruments are typically quite small. Accordingly, the antennas of hearing instruments should use battery power efficiently. Moreover, because some types of hearing instruments, such as completely-in-canal (CIC) hearing instruments, are primarily worn within the ear canals of users, the user's head and ear tissue may affect signals received and transmitted by antennas of hearing instruments.

This disclosure describes antennas for hearing instruments that may address one or more of these challenges. As described herein, an antenna for a hearing instrument may be connected to a first feedline segment and a second feedline segment. The first feedline segment and the second feedline segment together form a feedline for the antenna. The first and second feedline segments each extend horizontally (e.g., laterally) along an inner lateral surface of a shell of the hearing instrument. The inner lateral surface may be aligned with an anterior or posterior wall of the user's ear canal. The antenna itself includes a first arm connected to the first feedline segment and a second arm connected to the second feedline segment. The first arm initially extends in an inferior direction along the inner lateral surface of the shell from the first feedline segment. The second arm initially extends in a superior direction from the second feedline segment. Lengths of the first arm and the second arm may be selected for use in transmitting and receiving in a 2.4 GHz band.

In one example, this disclosure describes an antenna for a hearing instrument, wherein the antenna is connected to: a first feedline segment extending laterally along an inner lateral surface of a shell of the hearing instrument, a second feedline segment extending laterally along the inner lateral surface of the shell of the hearing instrument, and wherein the antenna comprises: a first arm connected to the first feedline segment and initially extending in an inferior direction, along the inner lateral surface of the shell, from the first feedline segment; and a second arm connected to the second feedline segment and initially extending in a superior direction, along the inner lateral surface of the shell, from the second feedline segment.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Wireless communication links are becoming an increasingly important aspect of hearing instruments, such as hearing aids. A hearing instrument may use wireless communication links to communicate with other hearing instruments or with other types of devices, such as mobile phones or hearing instrument accessories. Such communication links may serve a wide variety of purposes, such as streaming media data and sending sensor data.

A hearing instrument requires an antenna in order to perform wireless communication. In part because of the small sizes of hearing instruments and the limited storage capacities of the batteries of hearing instruments, designing antennas for hearing instruments is challenging. This is especially the case with respect to completely-in-canal (CIC) hearing instruments, In-The-Canal (ITC) hearing instruments, In-The-Ear (ITE) hearing instruments, and Invisible-In-The-Canal (IITC) hearing instruments. Because such hearing instruments are compact in size and may be fully located inside a user's ear or ear canal, antennas for such hearing instruments may suffer from head loading. Head loading is the attenuation of electromagnetic signals by the user's head. The problem of head loading may be especially pronounced in 2.4 GHz antennas used for Bluetooth Low Energy (BLE) radio applications. This disclosure describes antennas suitable for use in hearing instruments, such as CIC hearing instruments, ITC hearing instruments, ITE hearing instruments, and IITC hearing instruments. For example, the antenna designs of the disclosure may be suitable for use in hearing instruments with BLE radio applications in the 2.4 GHz band.

Figure 1:
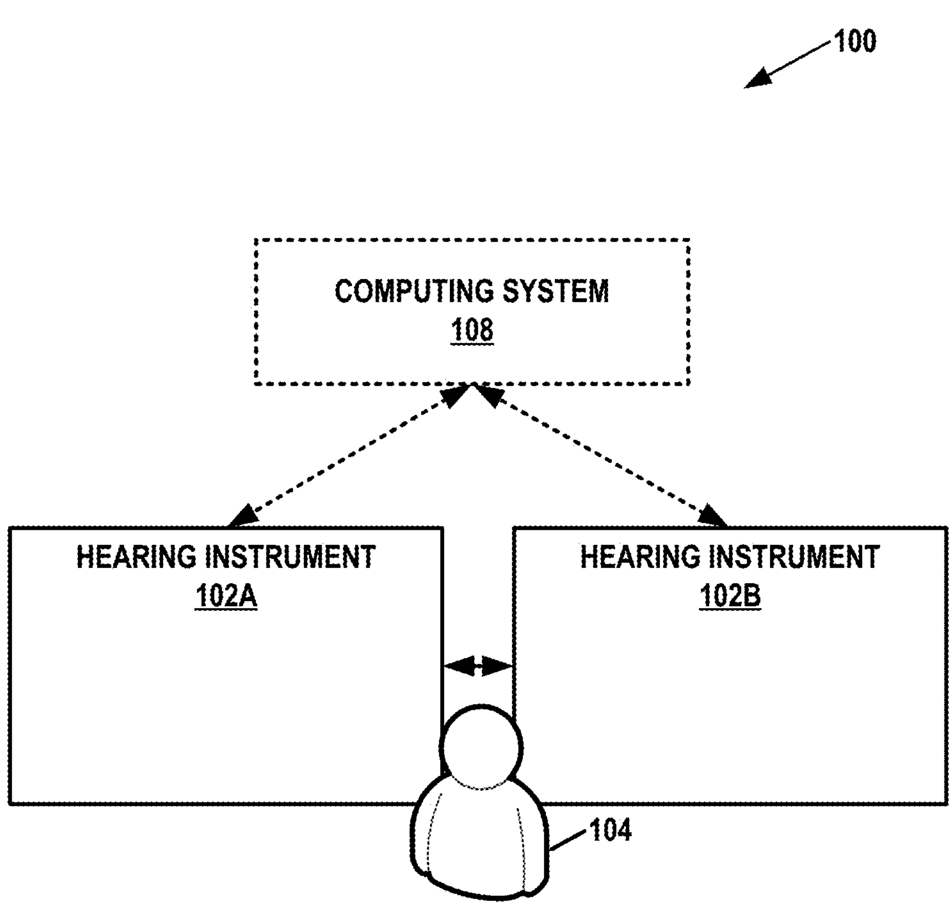
FIG. 1 is a conceptual diagram illustrating an example system that includes one or more hearing instrument(s), in accordance with one or more techniques of this disclosure.

FIG. 1 is a conceptual diagram illustrating an example system 100 that includes hearing instruments 102A, 102B, in accordance with one or more techniques of this disclosure. This disclosure may refer to hearing instruments 102A and 102B collectively, as "hearing instruments 102." A user 104 may wear hearing instruments 102. In some instances, such as when user 104 has unilateral hearing loss, user 104 may wear a single hearing instrument. In other instances, such as when user 104 has bilateral hearing loss, the user may wear two hearing instruments, with one hearing instrument for each ear of the user.

Hearing instruments 102 may comprise one or more of various types of devices that are configured to provide auditory stimuli to a user and that are designed for wear and/or implantation at, on, or near an ear of the user. Hearing instruments 102 may be worn, at least partially, in the ear canal or concha. One or more of hearing instruments 102 may include behind the ear (BTE) components that are worn behind the cars of user 104. In some examples, hearing instruments 102 comprise devices that are at least partially implanted into or integrated with the skull of the user. In some examples, one or more of hearing instruments 102 is able to provide auditory stimuli to user 104 via a bone conduction pathway.

In any of the examples of this disclosure, each of hearing instruments 102 may comprise a hearing assistance device. Hearing assistance devices include devices that help a user hear sounds in the user's environment. Example types of hearing assistance devices may include hearing aid devices, Personal Sound Amplification Products (PSAPs), cochlear implant systems (which may include cochlear implant magnets, cochlear implant transducers, and cochlear implant processors), and so on. In some examples, hearing instruments 102 are over-the-counter, direct-to-consumer, or prescription devices. Furthermore, in some examples, hearing instruments 102 include devices that provide auditory stimuli to the user that correspond to artificial sounds or sounds that are not naturally in the user's environment, such as recorded music, computer-generated sounds, or other types of sounds. For instance, hearing instruments 102 may include so-called "hearables," earbuds, earphones, or other types of devices. Some types of hearing instruments provide auditory stimuli to the user corresponding to sounds from the user's environmental and also artificial sounds.

In some examples, one or more of hearing instruments 102 includes a housing or shell that is designed to be worn in the ear for both aesthetic and functional reasons and encloses the electronic components of the hearing instrument. Such hearing instruments may be referred to as in-the-ear (ITE), in-the-canal (ITC), completely-in-the-canal (CIC), or invisible-in-the-canal (IIC) devices. In some examples, one or more of hearing instruments 102 may be behind-the-ear (BTE) devices, which include a housing worn behind the ear contains all of the electronic components of the hearing instrument, including the receiver (i.e., the speaker). The receiver conducts sound to an earbud inside the ear via an audio tube. In some examples, one or more of hearing instruments 102 may be receiver-in-canal (RIC) hearing-assistance devices, which include a housing worn behind the ear that contains electronic components and a housing worn in the ear canal that contains the receiver.

Hearing instruments 102 may implement a variety of features that help user 104 hear better. For example, hearing instruments 102 may amplify the intensity of incoming sound, amplify the intensity of certain frequencies of the incoming sound, or translate or compress frequencies of the incoming sound. In another example, hearing instruments 102 may implement a directional processing mode in which hearing instruments 102 selectively amplify sound originating from a particular direction (e.g., to the front of the user) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 102 may use beamforming or directional processing cues to implement or augment directional processing modes.

In some examples, hearing instruments 102 may reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wirelessly communication technologies. Example types of wireless communication technology include Near-Field Magnetic Induction (NFMI) technology, a 2.4 GHz technology, a BLUETOOTH™ technology, a WI-FI™ technology, audible sound signals, ultrasonic communication technology, infrared communication technology, an inductive communication technology, or another type of communication that does not rely on wires to transmit signals between devices. In some examples, hearing instruments 102 use a 2.4 GHz frequency band for wireless communication. In some examples of this disclosure, hearing instruments 102 may communicate with each other via non-wireless communication links (e.g., in addition to wireless communication links), such as via one or more cables, direct electrical contacts, and so on.

As shown in the example of FIG. 1, system 100 may also include a computing system 108. In other examples, system 100 does not include computing system 108. Computing system 108 comprises one or more computing devices, each of which may include one or more processors. For instance, computing system 108 may comprise one or more mobile devices, server devices, personal computer devices, handheld devices, wireless access points, smart speaker devices, smart televisions, medical alarm devices, smart key fobs, smartwatches, smartphones, motion or presence sensor devices, smart displays, screen-enhanced smart speakers, wireless routers, wireless communication hubs, prosthetic devices, mobility devices, special-purpose devices, accessory devices, and/or other types of devices. Accessory devices may include devices that are configured specifically for use with hearing instruments 102. Example types of accessory devices may include charging cases for hearing instruments 102, storage cases for hearing instruments 102, media streamer devices, phone streamer devices, external microphone devices, remote controls for hearing instruments 102, and other types of devices specifically designed for use with hearing instruments 102. Actions described in this disclosure as being performed by computing system 108 may be performed by one or more of the computing devices of computing system 108. One or more of hearing instruments 102 may communicate with computing system 108 using wireless or non-wireless communication links. For instance, hearing instruments 102 may communicate with computing system 108 and/or each other using any of the example types of communication technologies described elsewhere in this disclosure. For example, hearing instruments 102 may communicate with computing system 108 and/or each other using antennas conforming to the antenna designs described in this disclosure, e.g., with respect to FIG. 3 through FIG. 8.

Figure 2:
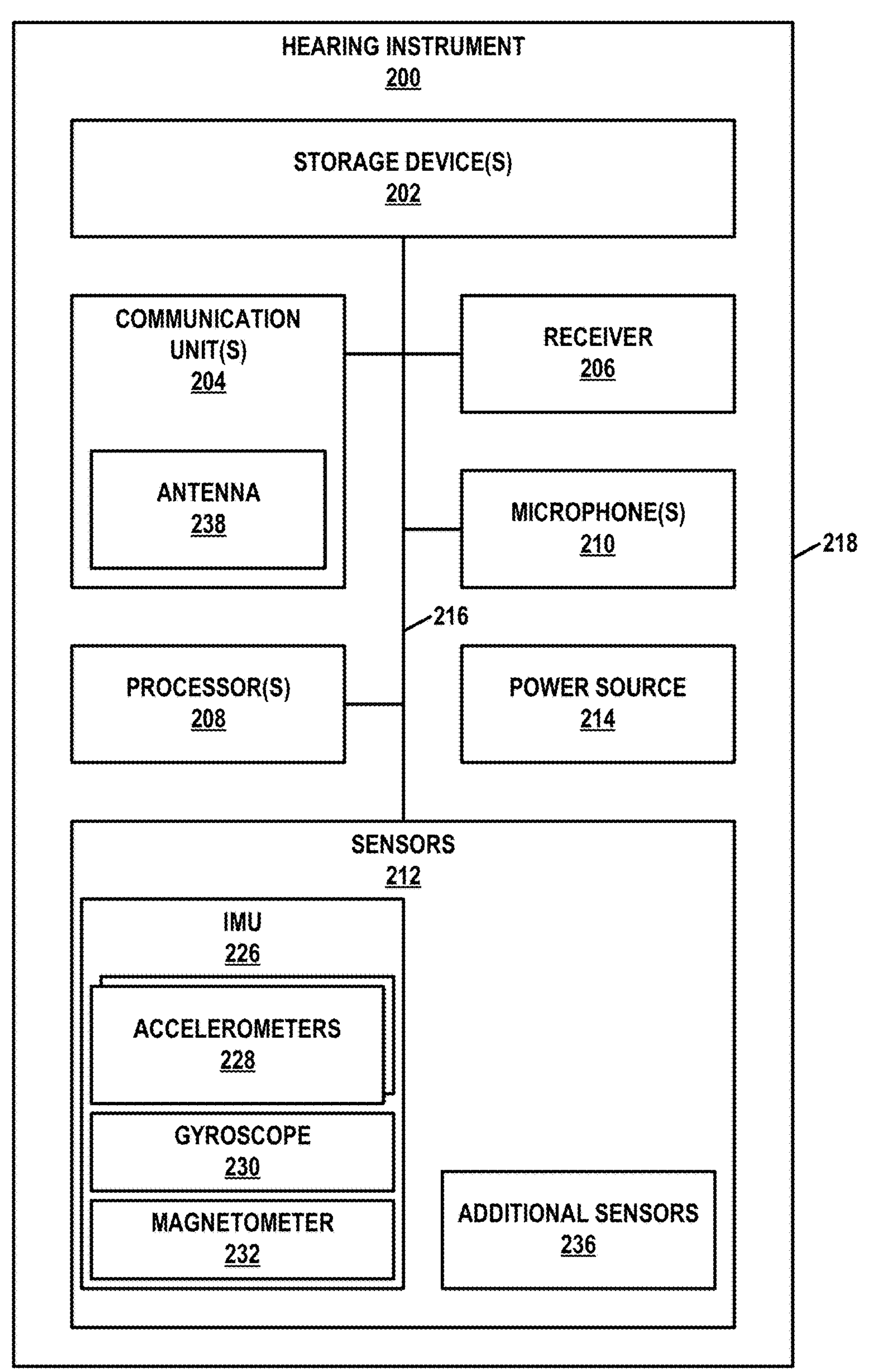
FIG. 2 is a block diagram illustrating example components of a hearing instrument, in accordance with one or more aspects of this disclosure.

FIG. 2 is a block diagram illustrating example components of hearing instrument 200, in accordance with one or more aspects of this disclosure. Hearing instrument 200 may be either one of hearing instruments 102. In the example of FIG. 2, hearing instrument 200 comprises one or more storage devices 202, one or more communication unit(s) 204, a receiver 206, one or more processor(s) 208, one or more microphone(s) 210, a set of sensors 212, a power source 214, and one or more communication channels 216. Communication channels 216 provide communication between storage devices 202, communication unit(s) 204, receiver 206, processor(s) 208, a microphone(s) 210, and sensors 212. Components 202, 204, 206, 208, 210, and 212 may draw electrical power from power source 214. In the example of FIG. 2, each of components 202, 204, 206, 208, 210, 212, 214, and 216 are contained within a single housing 218.

Furthermore, in the example of FIG. 2, sensors 212 include an inertial measurement unit (IMU) 226 that is configured to generate data regarding the motion of hearing instrument 200. IMU 226 may include a set of sensors. For instance, in the example of FIG. 2, IMU 226 includes one or more of accelerometers 228, a gyroscope 230, a magnetometer 232, combinations thereof, and/or other sensors for determining the motion of hearing instrument 200. Furthermore, in the example of FIG. 2, hearing instrument 200 may include one or more additional sensors 236. Additional sensors 236 may include a photoplethysmography (PPG) sensor, blood oximetry sensors, blood pressure sensors, electrocardiograph (EKG) sensors, body temperature sensors, electroencephalography (EEG) sensors, environmental temperature sensors, environmental pressure sensors, environmental humidity sensors, skin galvanic response sensors, and/or other types of sensors. In other examples, hearing instrument 200 and sensors 212 may include more, fewer, or different components.

Storage devices 202 may store data. Storage devices 202 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage devices 202 may further be configured for long-term storage of information as non-volatile memory space and retain information after power on/off cycles. Examples of non-volatile memory configurations may include magnetic hard discs, optical discs, flash memories, or forms of electrically programmable memories (EPROM) or electrically erasable and programmable (EEPROM) memories.

Communication unit(s) 204 may enable hearing instrument 200 to send data to and receive data from one or more other devices, such as another hearing instrument, an accessory device, a mobile device, or another types of device. Communication unit(s) 204 may enable hearing instrument 200 using wireless or non-wireless communication technologies. For instance, communication unit(s) 204 enable hearing instrument 200 to communicate using one or more of various types of wireless technology, such as a BLUETOOTH™ technology, 3G, 4G, 4G LTE, 5G, ZigBee, WI-FI™, Near-Field Magnetic Induction (NFMI), ultrasonic communication, infrared (IR) communication, or another wireless communication technology. In some examples, communication unit(s) 204 may enable hearing instrument 200 to communicate using a cable-based technology, such as a Universal Serial Bus (USB) technology.

As shown in the example of FIG. 2, communication unit(s) 204 include an antenna 238. Antenna 238 may be implemented in accordance with any of the example antenna designs described in this disclosure, such as the antenna designs described with respect to FIG. 3A through FIG. 8B.

Receiver 206 comprises one or more speakers for generating audible sound. Microphone(s) 210 detects incoming sound and generates one or more electrical signals (e.g., an analog or digital electrical signal) representing the incoming sound.

Processor(s) 208 may be processing circuits configured to perform various activities. For example, processor(s) 208 may process the signal generated by microphone(s) 210 to enhance, amplify, or cancel-out particular channels within the incoming sound. Processor(s) 208 may then cause receiver 206 to generate sound based on the processed signal. In some examples, processor(s) 208 include one or more digital signal processors (DSPs). In some examples, processor(s) 208 may cause communication unit(s) 204 to transmit one or more of various types of data. For example, processor(s) 208 may cause communication unit(s) 204 to transmit data to computing system 108. Furthermore, communication unit(s) 204 may receive audio data from computing system 108 and processor(s) 208 may cause receiver 206 to output sound based on the audio data.

FIGS. 3A, 3B, 4A, 4B, 5A, 5B, 6A, 6B, 7A, 7B, 7C, 7D, 7E, 8A, and 8B are example antennas that are implemented in accordance with techniques of this disclosure. The techniques of this disclosure encompass antenna designs in addition to those shown in the examples of FIGS. 3A, 3B, 4A, 4B, 5A, 5B, 6A, 6B, 7A, 7B, 7C, 7D, 7E, 8A, and 8B. Other antenna designs in accordance with the techniques of this disclosure are possible. The examples of FIGS. 3A, 4A, 5A, 6A, 7A, and 8A show CIC hearing instruments. However, the antenna designs of this disclosure may be used in other types of hearing instruments, such as ITC hearing instruments, ITE hearing instruments, IITC hearing instruments, and so on.

Figure 3A:
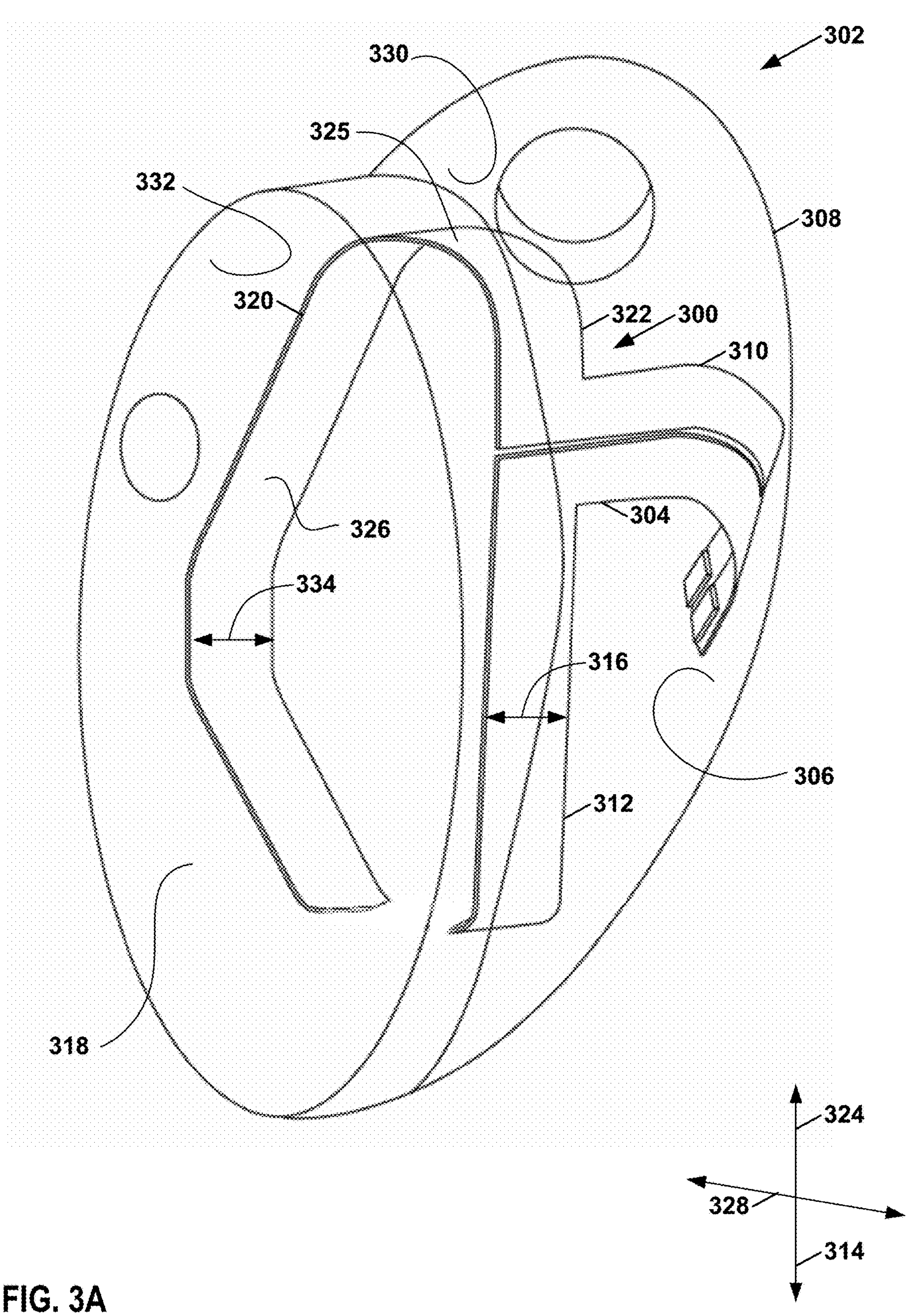
FIG. 3A is a conceptual diagram illustrating a first example antenna for a hearing instrument, in accordance with one or more aspects of this disclosure.

FIG. 3A is a conceptual diagram illustrating an example antenna 300 for a hearing instrument 302, in accordance with one or more aspects of this disclosure. Antenna 300 may be considered to be an example of a dipole antenna. In the example of FIG. 3A, antenna 300 is connected to a first feedline segment 304 extending laterally along an inner posterior surface 306 of a shell 308 of hearing instrument 302. Additionally, antenna 300 is connected to a second feedline segment 310 extending laterally along the inner posterior surface 306 of shell 308. First feedline segment 304 and second feedline segment 310 may be connected to internal electronic components of hearing instrument 302, such as processor(s) 208 (FIG. 2), power source 214 (FIG. 2), and so on. Inner posterior surface 306 may be aligned with a posterior wall of a user's ear canal.

Antenna 300 comprises a first arm 312 connected to first feedline segment 304. First arm 312 initially extends in an inferior direction 314 along inner posterior surface 306 of shell 308 from first feedline segment 304. A width 316 of first arm 312 may be substantially orthogonal to a faceplate 318 of hearing instrument 302.

Antenna 300 also includes a second arm 320. Second arm 320 is connected to second feedline segment 310 and initially extends in a superior direction 324 along inner posterior surface 306 of shell 308 from second feedline segment 310. Second arm 320 includes a first lateral segment 322, a superior segment 325, and a second lateral segment 326. First lateral segment 322 extends in superior direction 324 along the inner posterior surface 306 of shell 308. Superior segment 325 extends in a sagittal direction 328 along an inner superior surface 330 of shell 308. Second lateral segment 326 extends in inferior direction 314 along an inner anterior surface 332 of shell 308. A width 334 of second arm 320 is substantially orthogonal to faceplate 318 of hearing instrument 302.

In some examples, an inferior segment of first arm 312 and/or second arm 320 connects an inferior end of first arm 312 to an inferior end of second arm 320. In other examples, first arm 312 and second arm 320 are separated, as shown in FIG. 3A. Furthermore, in some examples, an inferior extremity of first arm 312 extends in the sagittal direction 328 but does not connect to second arm 320; or an inferior extremity of second arm 320 extends in the sagittal direction 328 but does not connect to first arm 312.

Figure 3B:
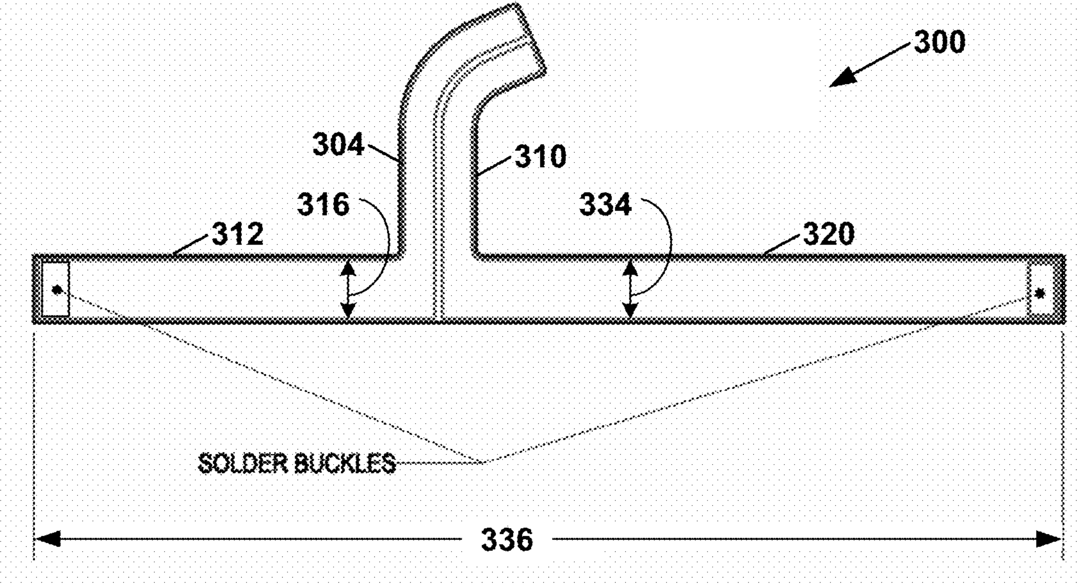
FIG. 3B is a conceptual diagram illustrating a version of the first example antenna of FIG. 3A when folded flat, in accordance with one or more aspects of this disclosure.

FIG. 3B is a conceptual diagram illustrating a version of the first example antenna 300 when folded flat, in accordance with one or more aspects of this disclosure. As shown in the example of FIG. 3B, a combined length of first arm 312 and second arm 320 of antenna 300 may be in a range including 1.305 inches to 1.384 inches. For instance, the combined length 336 of first arm 312 and second arm 320 may be 1.305, 1.330 1.345, or 1.384 inches. In some examples, the width 316 of first arm 312 and width 334 of second arm 320 may be in a range including 0.0486 inches to 0.1273 inches. For instance, the width of first arm 312 and width 334 of second arm 320 may be 0.0486, 0.088, 0.100, or 0.1273 inches. The solder pads (which may also be referred to as solder buckles) indicated in FIG. 3B and elsewhere in this disclosure may be used to solder or otherwise connect external parts to the antenna.

Figure 4A:
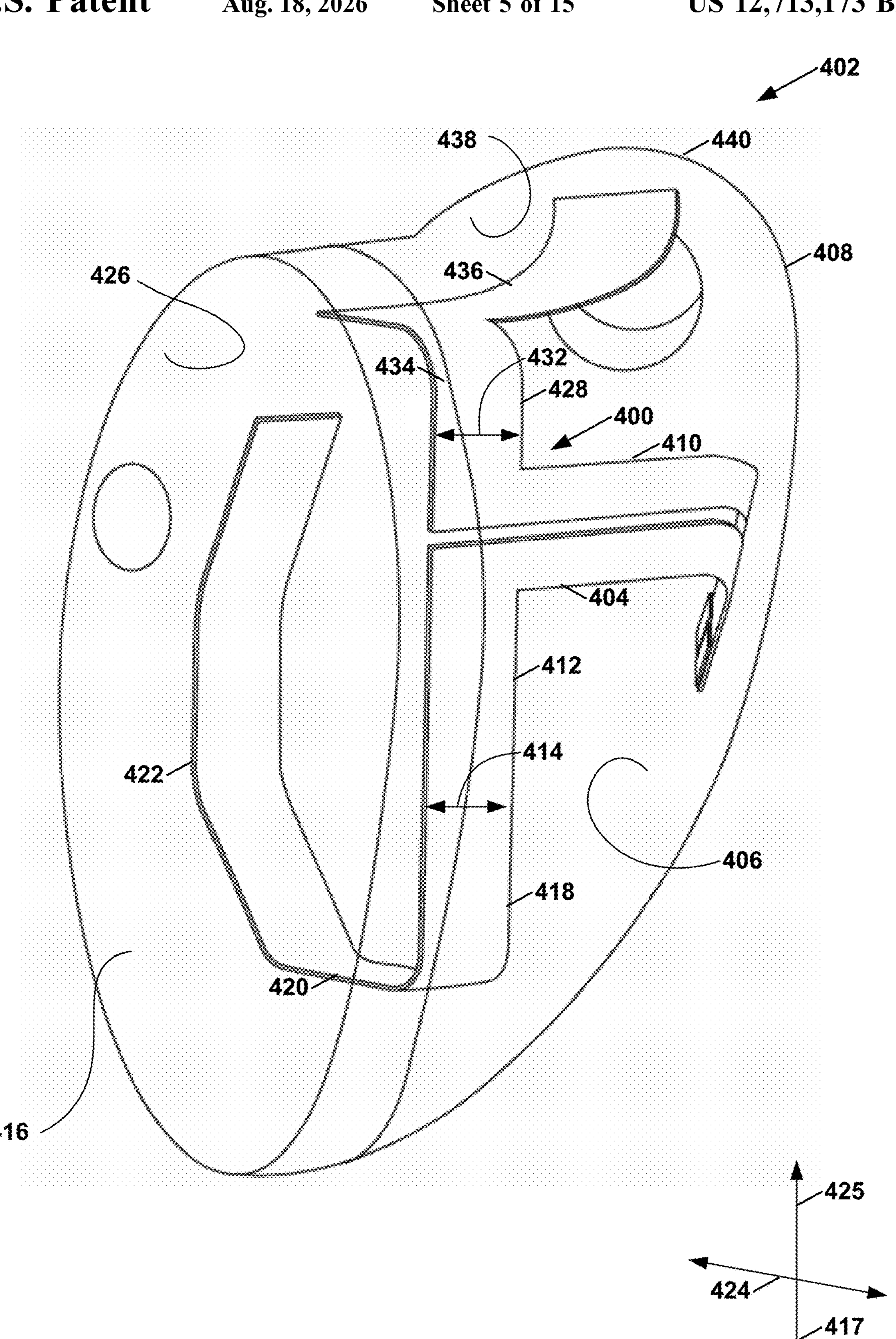
FIG. 4A is a conceptual diagram illustrating a second example antenna for a hearing instrument, in accordance with one or more aspects of this disclosure.

FIG. 4A is a conceptual diagram illustrating an example antenna 400 for a hearing instrument 402, in accordance with one or more aspects of this disclosure. In the example of FIG. 4A, antenna 400 is connected to a first feedline segment 404 that extends laterally along an inner posterior surface 406 of a shell 408 of hearing instrument 402. In addition, antenna 400 is connected to a second feedline segment 410 that extends laterally along the inner posterior surface 406 of shell 408. First feedline segment 404 and second feedline segment 410 may be connected to internal electronic components of hearing instrument 402, such as processor(s) 208, power source 214, and so on. Inner posterior surface 406 may be aligned with a posterior wall of a user's ear canal.

Antenna 400 comprises a first arm 412. First arm 412 is connected to first feedline segment 404. A width 414 of first arm 412 may be substantially orthogonal to a faceplate 416 of hearing instrument 402. First arm 412 initially extends in an inferior direction 417 along inner posterior surface 406 of shell 408 from first feedline segment 404. In the example of FIG. 4A, first arm 412 includes a first lateral segment 418, an inferior segment 420, and a second lateral segment 422.

First lateral segment 418 of first arm 412 extends in the inferior direction 417 along the inner posterior surface 406 of shell 408. Inferior segment 420 of first arm 412 extends in a sagittal direction 424. Second lateral segment 422 of first arm 412 extends in a superior direction 425 along an inner anterior surface 426 of shell 408. Inner anterior surface 426 of shell 408 may be aligned with an anterior surface of the user's ear canal.

Antenna 400 comprises a second arm 428 that is connected to second feedline segment 410. Second arm 428 initially extends in superior direction 425 along inner posterior surface 406 of shell 408 from second feedline segment 410. A width 432 of second arm 428 is initially substantially orthogonal to faceplate 416 of hearing instrument 402.

In the example of FIG. 4A, second arm 428 comprises a lateral segment 434 and a superior segment 436. Superior segment 436 extends along an inner superior surface 438 of shell 408 toward a medial end 440 of shell 408. Inner superior surface 438 may be aligned with a superior surface of the user's ear canal. Lateral segment 434 is connected to a lateral end of second feedline segment 410 and extends from a lateral end of second feedline segment 410 in superior direction 425 along the inner posterior surface 406 of shell 408 and inner superior surface 438 of shell 408. A superior end of lateral segment 434 connects to a lateral end of superior segment 436.

Figure 4B:
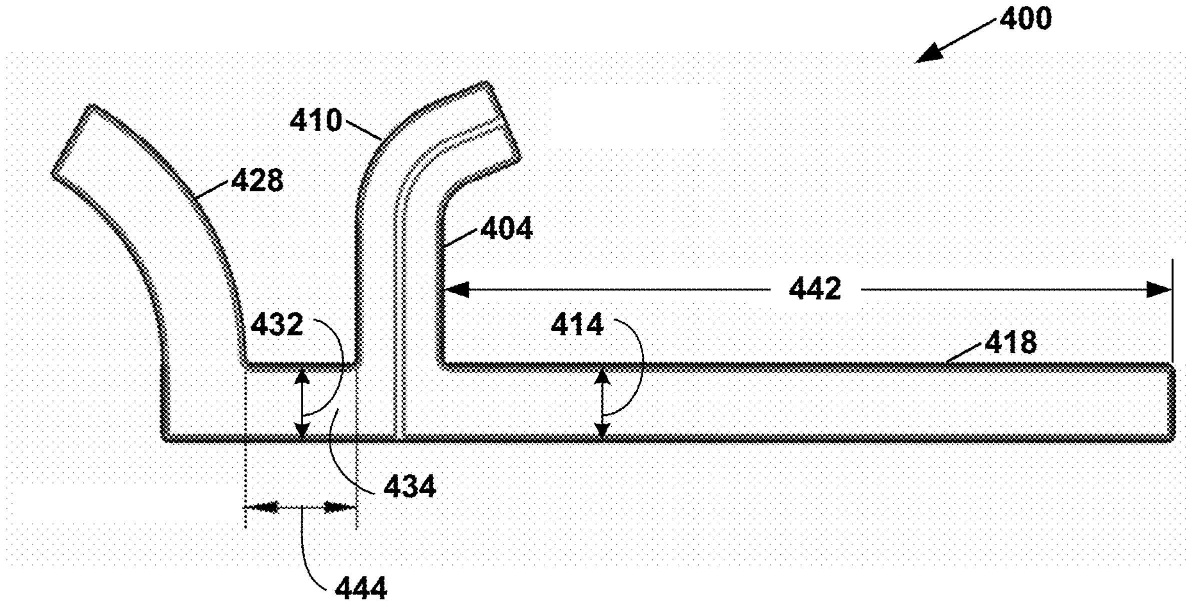
FIG. 4B is a conceptual diagram illustrating a version of the second example antenna of FIG. 4A when folded flat, in accordance with one or more aspects of this disclosure.

FIG. 4B is a conceptual diagram illustrating a version of the second example antenna 400 when folded flat, in accordance with one or more aspects of this disclosure. As shown in the example of FIG. 4B, a length 442 of first arm 418 of antenna 400 may be in a range including 0.812 inches to 0.891 inches. For instance, a length 442 of first arm 418 may be 0.812, 0.850, 0.852, or 0.891 inches. A length 444 of lateral segment 434 of second arm 428 of antenna 400 may be in a range including 0.090 inches to 0.169 inches. For instance, a length 444 of lateral segment 434 of second arm 428 may be in a range including 0.090, 0.120, 0.130, or 0.169 inches. In some examples, the width 414 of first arm 418 and width 432 of second arm 428 may be in a range including 0.048 inches to 0.127 inches. For instance, width 414 of first arm 418 and width 432 of second arm 428 may be 0.048, 0.060, 0.088, or 0.127 inches. Furthermore, in some examples, a distance from a medial tip of superior segment 436 to a distal edge of superior segment 436 may be in a range including 0.351 inches to 0.430 inches. For instance, the distance from the medial tip of superior segment 436 to distal edge of superior segment 436 may be 0.351, 0.391, 0.400, or 0.430 inches.

Figure 5A:
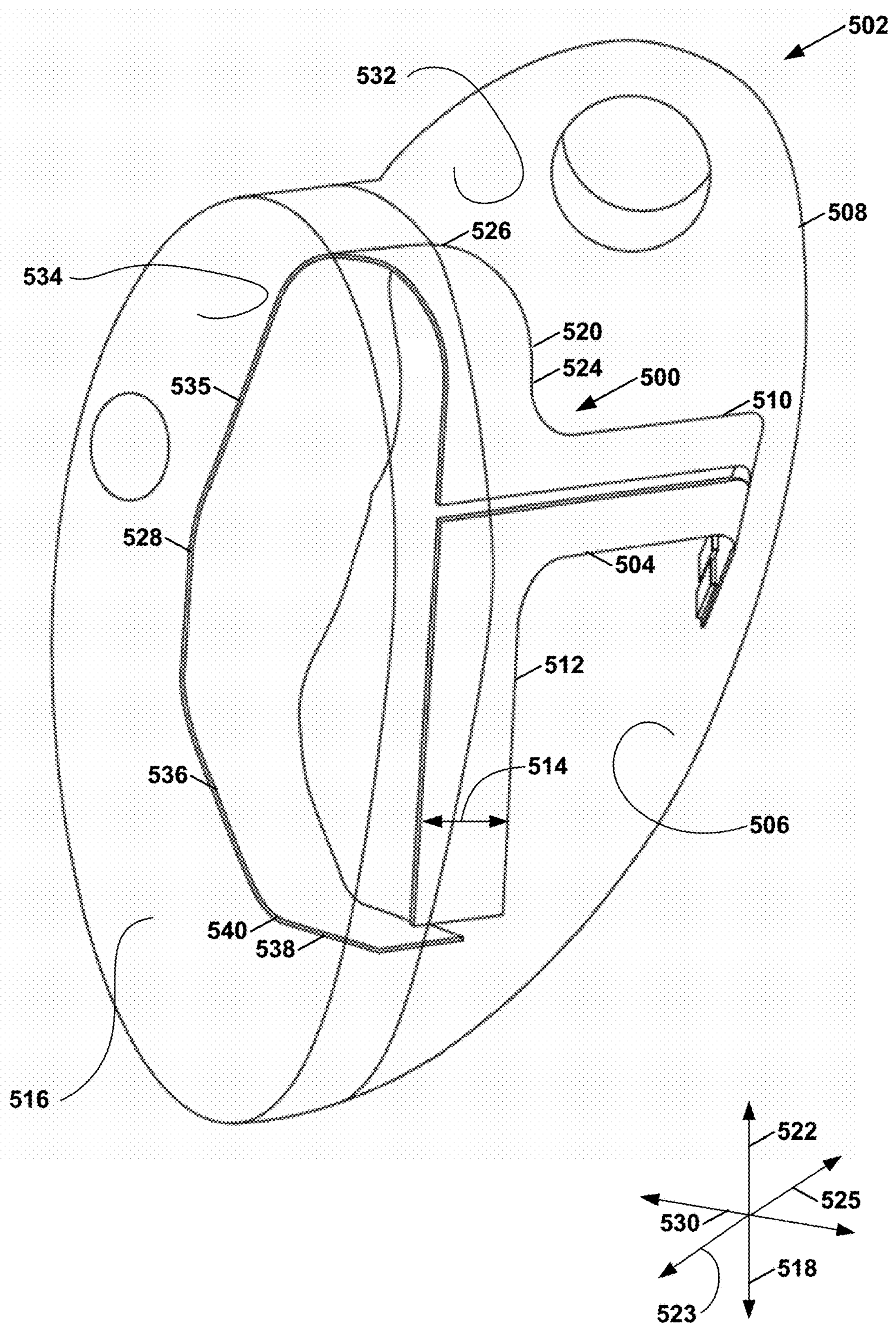
FIG. 5A is a conceptual diagram illustrating a third example antenna for a hearing instrument, in accordance with one or more aspects of this disclosure.

FIG. 5A is a conceptual diagram illustrating an example antenna 500 for a hearing instrument 502, in accordance with one or more aspects of this disclosure. Antenna 500 is connected to a first feedline segment 504 extending laterally along an inner posterior surface 506 of a shell 508 of hearing instrument 502. Antenna 500 is also connected to a second feedline segment 510 extending laterally along inner posterior surface 506 of shell 508. First feedline segment 504 and second feedline segment 510 may be connected to internal electronic components of hearing instrument 502, such as processor(s) 208, power source 214, and so on. Inner posterior surface 506 may be aligned with a posterior wall of a user's ear canal.

In the example of FIG. 5A, antenna 500 comprises a first arm 512 connected to first feedline segment 504. A width 514 of first arm 512 may be substantially orthogonal to a faceplate 516 of hearing instrument 502. First arm 512 initially extends in an inferior direction 518 along inner posterior surface 506 of shell 508 from first feedline segment 504.

Antenna 500 also includes a second arm 520 connected to second feedline segment 510. Second arm 520 initially extends in a superior direction 522 along the inner posterior surface 506 of shell 508 from second feedline segment 510. Second arm 520 includes a first lateral segment 524, a superior segment 526, and a second lateral segment 528. First lateral segment 524 extends in the superior direction 522 along the inner posterior surface 506 of shell 508. Superior segment 526 extends in a sagittal direction 530 along an inner superior surface 532 of shell 508. The inner superior surface 532 may be aligned with a superior surface of the user's ear canal.

Second lateral segment 528 of second arm 520 extends in the inferior direction 518 along an inner anterior surface 534 of shell 508. The inner anterior surface 534 of shell 508 may be aligned with an anterior surface of the user's ear canal. A width of second lateral segment 528 is greater in a superior portion 535 of second lateral segment 528 than an inferior portion 536 of second lateral segment 528. The greater width of second lateral segment 528 may increase the surface currents of antenna 500 in a lateral direction 523 and medial direction 525 perpendicular to faceplate 516 of hearing instrument 502 relative to antenna designs where the width of second lateral segment 528 is the same throughout. The increased surface currents in the lateral direction 523 and medial direction 525 may increase the efficiency of antenna 500. For example, increased surface currents in the lateral direction 523 and medial direction 525 may help direct and receive signals that propagate in a direction aligned with the user's ear canal. This may reduce head loading.

Furthermore, in the example of FIG. 5A, second lateral segment 528 includes an inferior segment 538 that is connected to an inferior end 540 of second lateral segment 528 and extends in sagittal direction 530. In some examples, a width of inferior segment 538 may be in a range including 0.048 inches to 0.127 inches. For instance, the width of inferior segment 538 may be 0.048, 0.088, 0.100, or 0.127 inches.

Figure 5B:
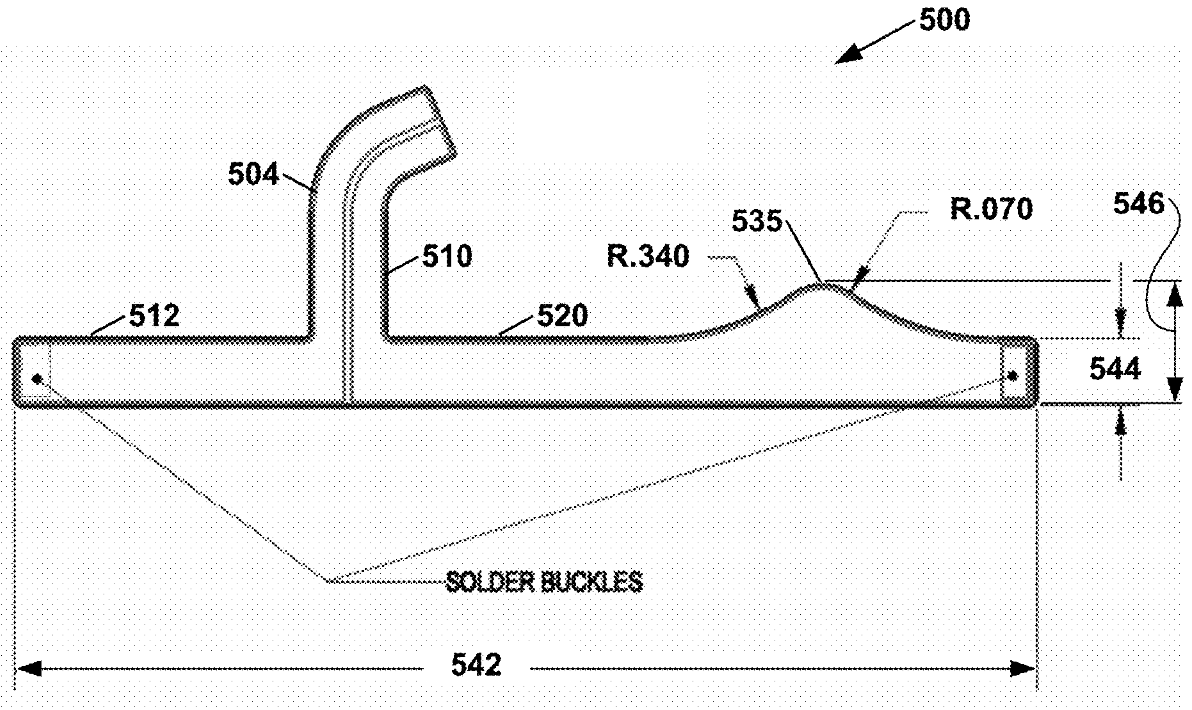
FIG. 5B is a conceptual diagram illustrating a version of the third example antenna of FIG. 5A when folded flat, in accordance with one or more aspects of this disclosure.

FIG. 5B is a conceptual diagram illustrating a version of the third example antenna 500 when folded flat, in accordance with one or more aspects of this disclosure. In the example of FIG. 5B, a total length 542 of first arm 512 of antenna 500 and second arm 520 of antenna 500 may be in a range including 1.300 inches to 1.733 inches. For instance, the total length 542 of first arm 512 and second arm 520 may be 1.300, 1.340, 1.602, or 1.733 inches. Furthermore, in the example of FIG. 5B, a width 544 of both first arm 512 and second arm 520 may be in a range including 0.048 inches to 0.127 inches. For instance, a width 544 of both first arm 512 and second arm 520 may be in a range including 0.048, 0.052, 0.088, or 0.127 inches. A width 546 of the superior portion 535 of second lateral segment 528 may be in a range including 0.118 inches to 0.197 inches. For instance, the width 546 of superior portion 535 of second lateral segment 528 may be 0.118, 0.158, 0.167, or 0197 inches. In the example of FIG. 5B, R.340 and R.070 indicate example hardness or softness of the corresponding curves.

Figure 6A:
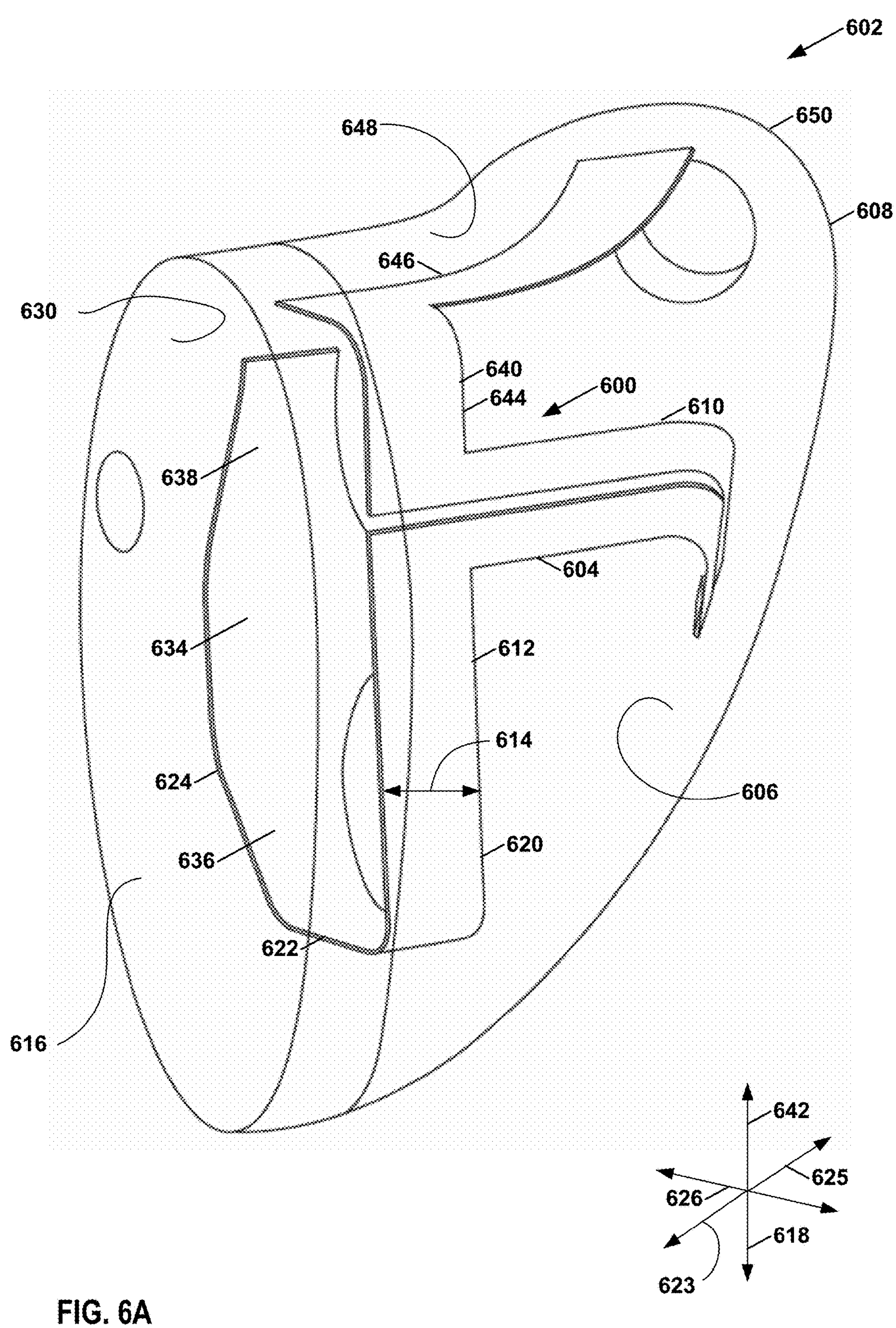
FIG. 6A is a conceptual diagram illustrating a fourth example antenna for a hearing instrument, in accordance with one or more aspects of this disclosure.

FIG. 6A is a conceptual diagram illustrating an example antenna 600 for a hearing instrument 602, in accordance with one or more aspects of this disclosure. Antenna 600 is connected to a first feedline segment 604 extending laterally along an inner posterior surface 606 of a shell 608 of hearing instrument 602. Antenna 600 is also connected to a second feedline segment 610 extending laterally along the inner posterior surface 606 of shell 608. First feedline segment 604 and second feedline segment 610 may be connected to internal electronic components of hearing instrument 602, such as processor(s) 208, power source 214, and so on. Inner posterior surface 606 may be aligned with a posterior wall of a user's ear canal.

In the example of FIG. 6A, antenna 600 includes a first arm 612 connected to first feedline segment 604. A width 614 of first arm 612 is substantially orthogonal to a faceplate 616 of hearing instrument 602. First arm 612 initially extends in an inferior direction 618 along inner posterior surface 606 of shell 608 from first feedline segment 604. Furthermore, in the example of FIG. 6A, first arm 612 further includes a first lateral segment 620, an inferior segment 622, and a second lateral segment 624. First lateral segment 620 of first arm 612 extends along inner posterior surface 606 of shell 608. Inferior segment 622 of first arm 612 extends in a sagittal direction 626.

Second lateral segment 624 of first arm 612 extends along an inner anterior surface 630 of shell 608. The inner anterior surface 630 of shell 608 may be aligned with an anterior surface of the user's ear canal. A width of second lateral segment 624 of first arm 612 is greater in a middle portion 634 of second lateral segment 624 than an inferior portion 636 of second lateral segment 624 and a superior portion 638 of second lateral segment 624. The greater width of middle portion 634 of second lateral segment 624 may increase the surface currents of antenna 600 in a lateral direction 623 and medial direction 625 perpendicular to faceplate 616 of hearing instrument 602 relative to antenna designs where the width of middle portion 634 is the same as widths of inferior portion 636 and superior portion 638. The increased surface currents in the lateral direction 623 and medial direction 625 may increase the efficiency of antenna 600. For example, increased surface currents in the lateral direction 623 and medial direction 625 may help direct and receive signals that propagate in a direction aligned with the user's ear canal. This may reduce head loading.

Antenna 600 also includes a second arm 640 connected to second feedline segment 610. Second arm 640 initially extends in a superior direction 642 along inner posterior surface 606 of shell 608 from second feedline segment 610.

In the example of FIG. 6A, second arm 640 comprises a lateral segment 644 and a superior segment 646. Superior segment 646 extends along an inner superior surface 648 of shell 608 toward a medial end 650 of shell 608. The inner superior surface 648 may be aligned with a superior surface of the user's ear canal. Lateral segment 644 is connected to a lateral end of second feedline segment 610 and extends from the lateral end of second feedline segment 610 in superior direction 642 along inner posterior surface 606 of shell 608 and the inner superior surface 648 of shell 608. A superior end of lateral segment 644 connects to a lateral end of superior segment 646.

Figure 6B:
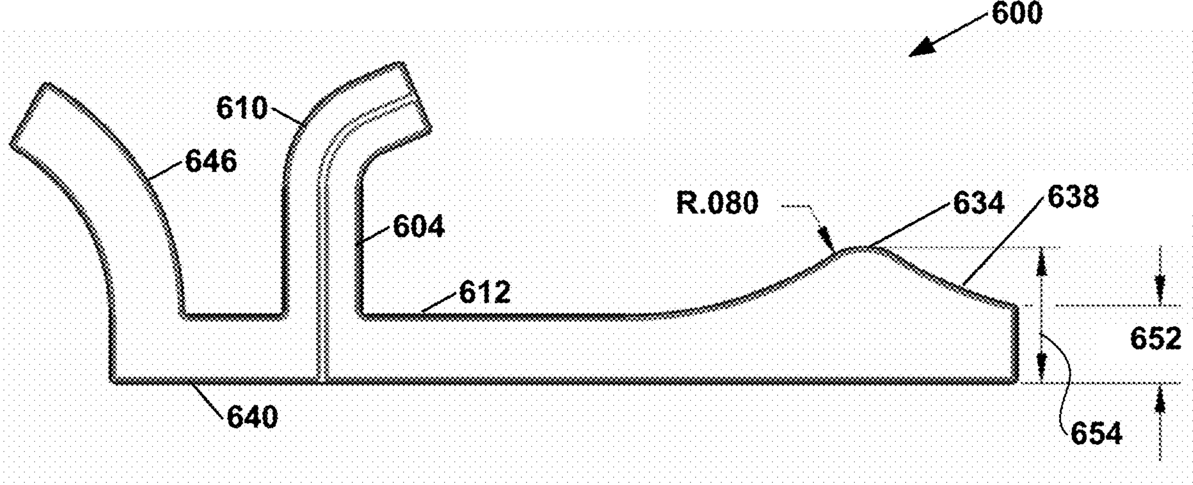
FIG. 6B is a conceptual diagram illustrating a version of the fourth example antenna of FIG. 6A when folded flat, in accordance with one or more aspects of this disclosure.

FIG. 6B is a conceptual diagram illustrating a version of the fourth example antenna 600 when folded flat, in accordance with one or more aspects of this disclosure. In the example of FIG. 6B, superior portion 638 may taper to a width 652 in a range that includes 0.062 inches to 0.141 inches. For instance, superior portion 638 may taper to a width 652 of 0.102, 0.124, 0.129, or 0.141 inches. Middle portion 634 has a maximum width 654 (which in the example of FIG. 6B is shown as a height) in a range that includes 0.138 inches to 0.217 inches with an example curve of R.080 at a peak of the curve of middle portion 634. For instance, middle portion 634 may have a maximum width 654 of 0.138, 0.142, 0.178, or 0.217 inches. Furthermore, in some examples, a distance from a medial tip of superior segment 646 to a distal edge of superior segment 436 may be in a range including 0.351 inches to 0.430 inches. For instance, the distance from the medial tip of superior segment 646 to the distal edge of superior segment 436 may be 0.351, 0.391, 0.400, or 0.430 inches.

Figure 7A:
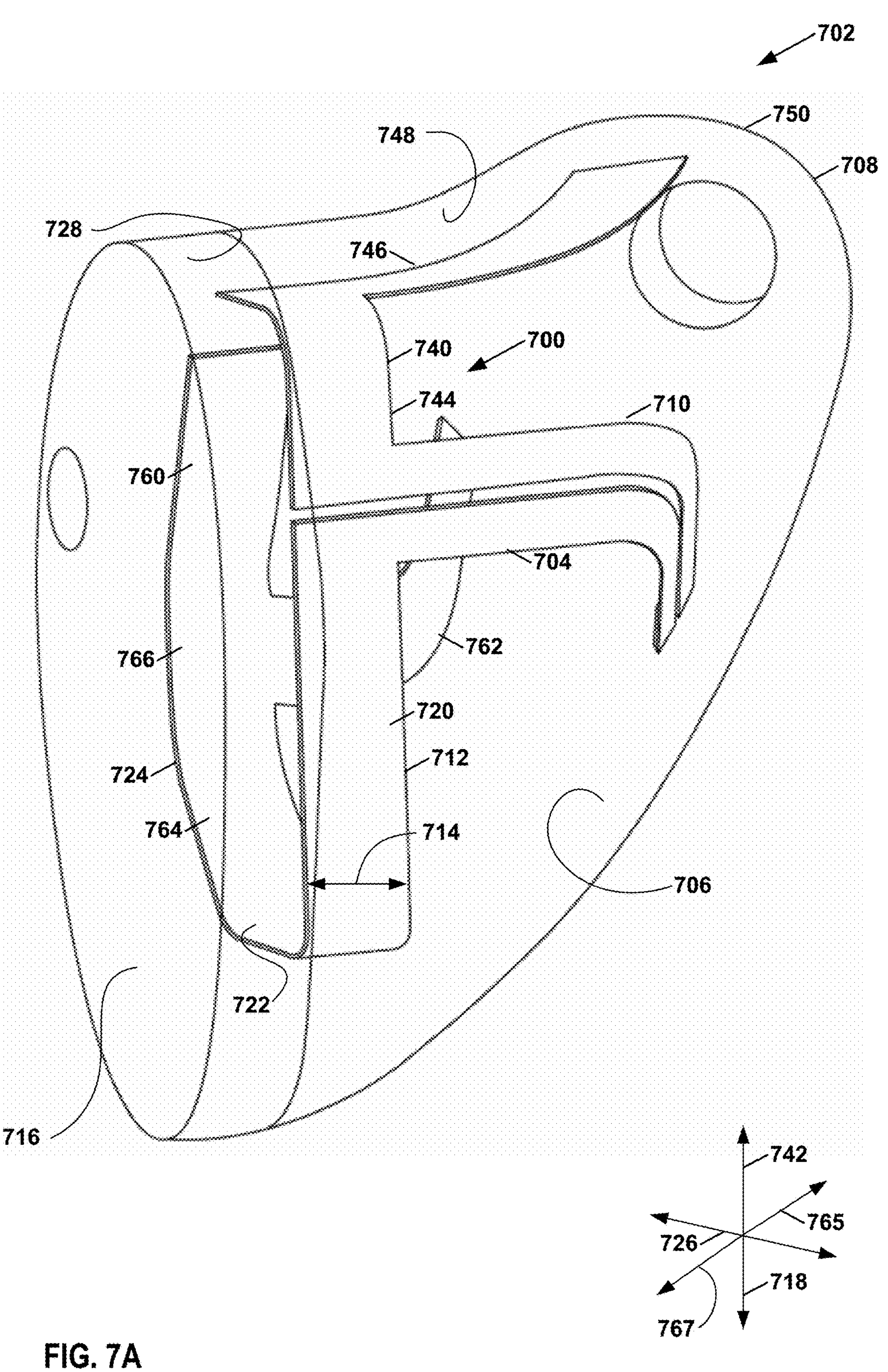
FIG. 7A is a conceptual diagram illustrating a fifth example antenna for a hearing instrument, in accordance with one or more aspects of this disclosure.

FIG. 7A is a conceptual diagram illustrating an example antenna 700 for a hearing instrument 700, in accordance with one or more aspects of this disclosure. Antenna 700 is connected to a first feedline segment 704 extending laterally along an inner posterior surface 706 of a shell 708 of hearing instrument 702. Antenna 700 is also connected to a second feedline segment 710 extending laterally along the inner posterior surface 706 of shell 708. First feedline segment 704 and second feedline segment 710 may be connected to internal electronic components of hearing instrument 702, such as processor(s) 208, power source 214, and so on. Inner posterior surface 706 may be aligned with a posterior wall of a user's ear canal.

In the example of FIG. 7A, antenna 700 includes a first arm 712 connected to first feedline segment 704. A width 714 of first arm 712 is substantially orthogonal to a faceplate 716 of hearing instrument 702. First arm 712 initially extends in an inferior direction 718 along inner posterior surface 706 of shell 708 from first feedline segment 704.

In the example of FIG. 7A, first arm 712 further includes a first lateral segment 720, an inferior segment 722, and a second lateral segment 724. First lateral segment 720 of first arm 712 extends along inner posterior surface 706 of shell 708. Inferior segment 722 of first arm 712 extends in a sagittal direction 726.

Second lateral segment 724 of antenna 700 extends along an inner anterior surface 728 of shell 708. The inner anterior surface 728 of shell 708 may be aligned with an anterior surface of the user's ear canal. Second lateral segment 724 has a first sub-arm 760, a second sub-arm 762, and a common section 764 inferior to a meeting point 766 of first sub-arm 760 and second sub-arm 762. First sub-arm 760 extends in a superior direction 742 from meeting point 766 along the inner anterior surface 728 of shell 708. Second sub-arm 762 extends at least initially in a medial direction 765 from meeting point 766 along the inner anterior surface 728 of shell 708. Thus, second sub-arm 762 may extend in a direction perpendicular to faceplate 716. In some examples, second sub-arm 762 may be at a position corresponding to a user's tragus.

Inclusion of second sub-arm 762 may increase the surface currents of antenna 700 in the lateral direction 767 and medial direction 765 perpendicular to faceplate 716 of hearing instrument 702 relative to antenna designs that omit second sub-arm 762. The increased surface currents in the lateral direction 767 and medial direction 765 may increase the efficiency of antenna 700. For example, increased surface currents in the lateral direction 767 and medial direction 765 may help direct and receive signals that propagate in a direction aligned with the user's ear canal. This may reduce head loading. Inclusion of a sub-arm, such as second sub-arm 762, that extends medially may force the surface current(s) to have a perpendicular direction of distribution. This may help to enhance the antenna efficiency and thus wireless performance. In addition, adding meander lines to both arms (e.g., as shown in the examples of FIGS. 7C, 7D, and 7E) may enable a wider range to tune the antennas by controlling the spacing of the meander line gap.

Antenna 700 also includes a second arm 740 connected to second feedline segment 710. Second arm 740 initially extends in superior direction 742 along inner posterior surface 706 of shell 708 from second feedline segment 710. In the example of FIG. 7A, second arm 740 comprises a lateral segment 744 and a superior segment 746. Superior segment 746 extends along an inner superior surface 748 of shell 708 toward a medial end 750 of shell 708. Lateral segment 744 is connected to a lateral end of second feedline segment 710 and extends from the lateral end of second feedline segment 710 in superior direction 742 along inner posterior surface 706 of shell 708 and inner superior surface 748 of shell 708. A superior end of lateral segment 744 connects to a lateral end of superior segment 746.

Figures 7B, 7C, 7D, 7E:
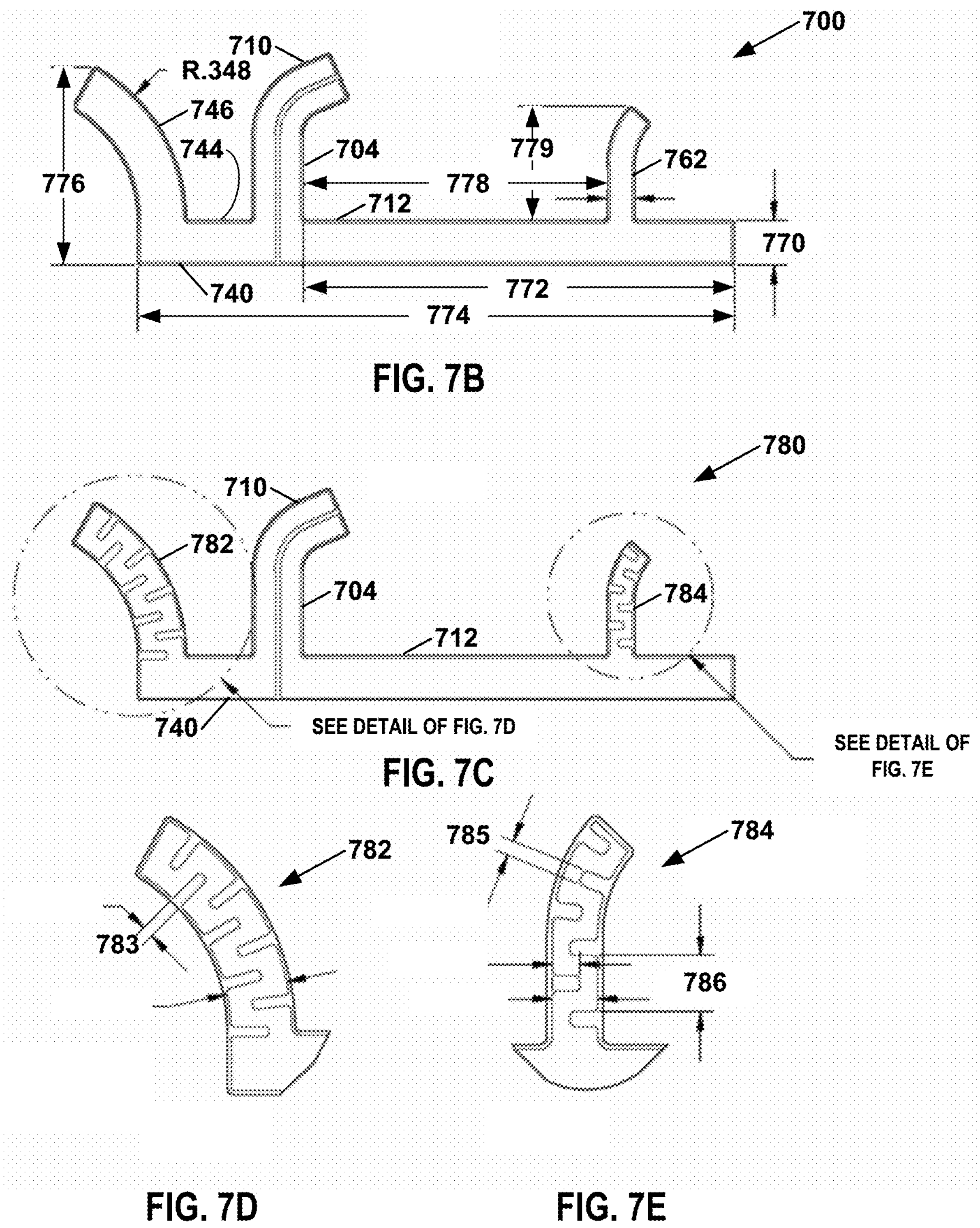
FIG. 7B is a conceptual diagram illustrating a version of the fifth example antenna of FIG. 7A when folded flat, in accordance with one or more aspects of this disclosure.
FIG. 7C is a conceptual diagram illustrating a version of the fifth example antenna of FIG. 7A when folded flat with a meandered superior segment and a meandered second sub-arm, in accordance with one or more aspects of this disclosure.
FIG. 7D is a conceptual diagram illustrating example details of the meandered superior segment of the fifth example antenna of FIG. 7C, in accordance with one or more aspects of this disclosure.
FIG. 7E is a conceptual diagram illustrating example details of the meandered second sub-arm of the fifth example antenna of FIG. 7C, in accordance with one or more aspects of this disclosure.

FIG. 7B is a conceptual diagram illustrating a version of the fifth example antenna 700 when folded flat, in accordance with one or more aspects of this disclosure. In the example of FIG. 7B, a width 770 of first arm 712 of antenna 700 may be in a range including 0.048 to 0.127 inches. For instance, the width 770 of first arm 712 may 0.048, 0.052, 0.088, or 0.120 inches. A length 772 of first arm 712 may be in a range including 0.812 to 0.891 inches. For instance, the length 772 of first arm 712 may be 0.812, 0.852, 0.856, or 0891 inches. A total length 774 of a length of first arm 712 plus a length of lateral segment 744 of second arm 740 may be in a range including 1.138 inches to 1.217 inches. For instance, the total length 774 of the length of first arm 712 plus the length of lateral segment 744 of second arm 740 may be 1.138, 1.201, 1.187, or 1.200 inches. A distance 776 from a medial tip of superior segment 746 to a distal edge of second arm 740 may be in a range including 0.351 inches to 0.430 inches. For instance, the distance 776 from the medial tip of superior segment 746 to the distal edge of second arm 740 may be 0.351, 0.391, 0.401, or 0.430 inches. A distance 778 from first feedline segment 704 to second sub-arm 762 may be in a range including 0.560 inches to 0.639 inches. For instance, the distance 762 from first feedline segment 704 to second sub-arm 762 may be 0.560, 0.565, 0.600, or 0.639 inches. A distance 779 from a medial tip of second sub-arm 762 to first arm 712 may be in a range including 0.185 inches to 0.264 inches. For instance, the distance 779 from the medial tip of second sub-arm 762 to first arm 712 may be 0.185, 0.225, 0.260, or 0.264 inches. A width of second sub-arm 762 may be in a range including 0.015 inches to 0.094 inches. For instance, the width of second sub-arm 762 may be in 0.015, 0.055 inches, 0.060, or 0.094 inches.

FIG. 7C is a conceptual diagram illustrating a version of the fifth example antenna 780 when folded flat with a meandered superior segment 782 and a meandered second sub-arm 784, in accordance with one or more aspects of this disclosure. Other aspects of antenna 780 may be the same as antenna 700.

FIG. 7D is a conceptual diagram illustrating example details of the meandered superior segment 782 of the fifth example antenna 780, in accordance with one or more aspects of this disclosure. As shown in the example of FIG. 7D, a maximum width of superior segment 782 may be in a range including 0.046 inches to 0.125 inches. For instance, the maximum width of superior segment 782 may be 0.046, 0.086, 0.100, or 0.125 inches. A width 783 of the notches in superior segment 782 may be in a range including 0.010 inches to 0.020 inches. For instance, the width 783 of the notches in superior segment 782 may be 0.011, 0.015, 0.016, or 0.017 inches.

FIG. 7E is a conceptual diagram illustrating example details of the meandered second sub-arm 784 of the fifth example antenna 780, in accordance with one or more aspects of this disclosure. As shown in the example of FIG. 7E, a maximum width of second sub-arm 784 may be in a range including 0.005 inches to 0.084 inches. For instance, the maximum width of second sub-arm 784 may be in 0.005, 0.045, 0.050, or 0.084 inches. A width 785 of the notches in second sub-arm 784 may be in a range including 0.010 inches to 0.020 inches. For instance, the width 785 of the notches in second sub-arm 784 may be 0.010, 0.015, 0.016, or 0.020 inches. A depth of the notches in second sub-arm 784 may be in a range including 0.005 inches to 0.084 inches. For instance, the depth of the notches in second sub-arm 784 may be 0.005, 0.045, 0.047, 0.049, or 0.084 inches. A distance 786 between notches in second sub-arm 784 may be in a range including 0.015 inches to 0.094 inches. For instance, the distance 786 between notches in second sub-arm 784 may be in 0.015, 0.055, 0.060, 0.062, or 0.094 inches.

Figure 8A:
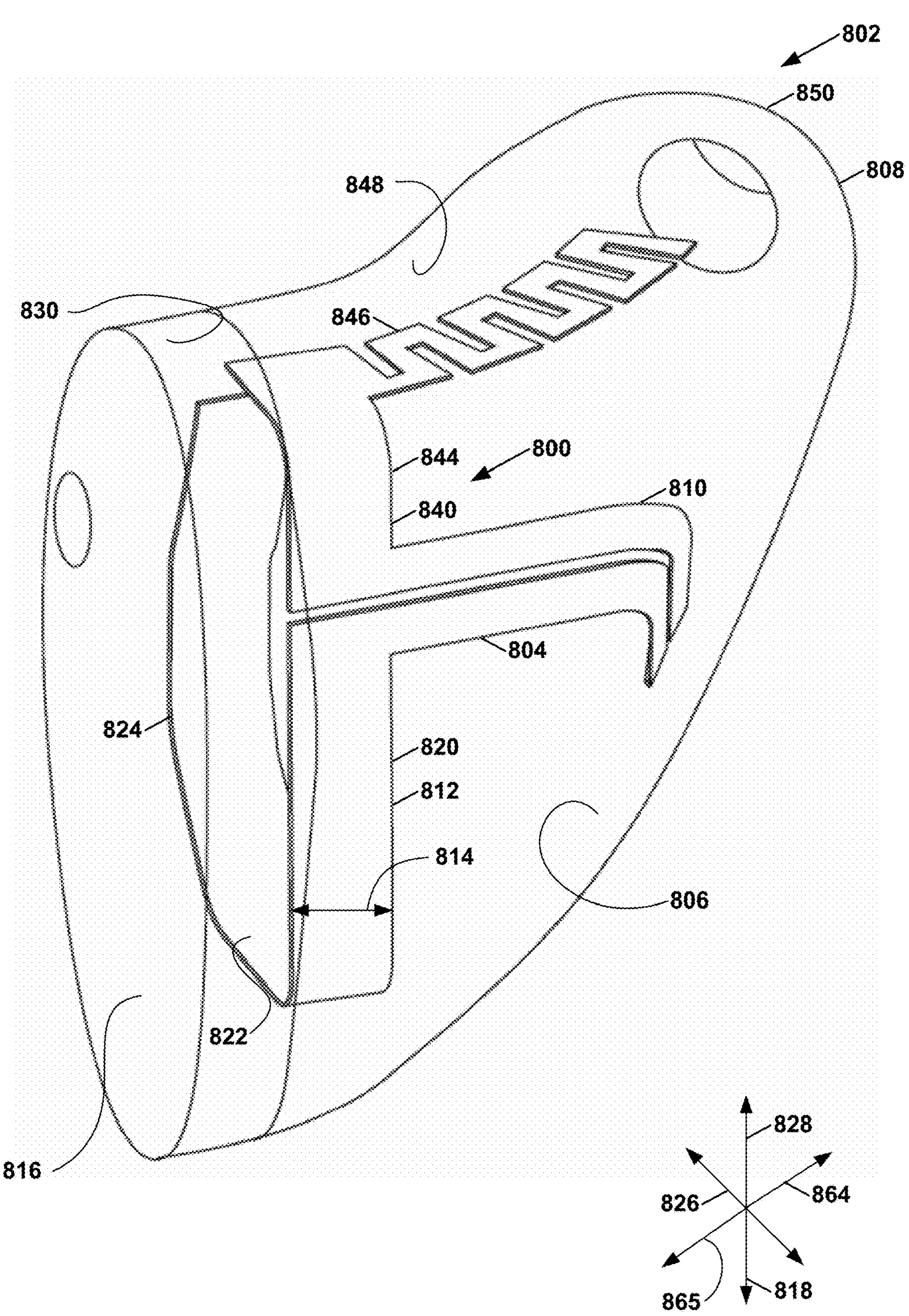
FIG. 8A is a conceptual diagram illustrating a sixth example antenna, in accordance with one or more aspects of this disclosure.

FIG. 8A is a conceptual diagram illustrating an example antenna 800 of a hearing instrument 802, in accordance with one or more aspects of this disclosure. In the example of FIG. 8A, antenna 800 is connected to a first feedline segment 804 that extends laterally along an inner posterior surface 806 of a shell 808 of hearing instrument 802. In addition, antenna 800 is connected to a second feedline segment 810 that extends laterally along the inner posterior surface 806 of shell 808. First feedline segment 804 and second feedline segment 810 may be connected to internal electronic components of hearing instrument 802, such as processor(s) 208, power source 214, and so on. Inner posterior surface 806 may be aligned with a posterior wall of a user's ear canal.

Antenna 800 comprises a first arm 812. First arm 812 is connected to first feedline segment 804. A width 814 of first arm 812 is substantially orthogonal to a faceplate 816 of hearing instrument 802. First arm 812 initially extends in an inferior direction 818 along inner posterior surface 806 of shell 808 from first feedline segment 804.

First arm 812 further includes a first lateral segment 820, an inferior segment 822, and a second lateral segment 824. First lateral segment 820 of first arm 812 extends along inner posterior surface 806 of shell 808. Inferior segment 822 of first arm 712 extends in a sagittal direction 826. Second lateral segment 824 of first arm 812 extends in a superior direction 828 along an inner anterior surface 830 of shell 808.

Antenna 800 also includes a second arm 840 connected to second feedline segment 810. Second arm 840 initially extends in a superior direction 828 along inner posterior surface 806 of shell 808 from second feedline segment 810. In the example of FIG. 8A, second arm 840 comprises a lateral segment 844 and a superior segment 846. Superior segment 846 extends along an inner superior surface 848 of shell 808 toward a medial end 850 of shell 808. Lateral segment 844 is connected to a lateral end of second feedline segment 810 and extends from the lateral end of second feedline segment 810 in superior direction 828 along inner posterior surface 806 of shell 808 and the inner superior surface 848 of shell 808. A superior end of lateral segment 844 connects to a lateral end of superior segment 846.

As shown in the example of FIG. 8A, superior segment 846 is meandered. A level of meandering of superior segment 846 may be used to tune antenna 800 to a specific frequency. The meandering of superior segment 846 may result in a greater flow of surface currents through in antenna 800 relative a non-meandered version of antenna. Furthermore, meandering of superior segment 846 may increase the surface current of antenna 800 in a lateral direction 865 and medial direction 864 perpendicular to faceplate 816 of hearing instrument 802 relative to antenna designs where superior segment 846 is not meandered. The increased surface currents in the lateral direction 865 and medial direction 864 may increase the efficiency of antenna 800. For example, increased surface currents in the lateral direction 865 and medial direction 864 may help direct and receive signals that propagate in a direction aligned with the user's ear canal. This may reduce head loading. Inclusion of a segment, such as superior segment 846, that extends medially may force the surface current(s) to have a perpendicular direction of distribution. This may help to enhance the antenna efficiency and thus wireless performance. In addition, adding meander lines to both arms (e.g., as shown in the examples of FIGS. 8A and 8B) may enable a wider range to tune the antennas by controlling the spacing of the meander line gap.

In some examples, superior segment 436 of antenna 400 (FIG. 4A), superior segment 646 of antenna 600 (FIG. 6A) and/or the superior segment 746 of antenna 700 (FIG. 7A) is meandered in the same manner as superior segment 846 of antenna 800 (FIG. 8A).

In each of the examples of FIGS. 3A, 3B, 4A, 4B, 5A, 5B, 6A, 6B, 7A, 7B, 8A, and 8B, the antennas may be designed to operate in accordance with a Bluetooth Low Energy (BLE) standard. BLE frequencies are approximately 2.4 GHz. Furthermore, in each of the examples of FIGS. 3A, 3B, 4A, 4B, 5A, 5B, 6A, 6B, 7A, 7B, 8A, and 8B, the inner posterior surface and the inner anterior surfaces are instances of inner lateral surfaces of the shells. In alternative versions of each of the examples of FIGS. 3A, 3B, 4A, 4B, 5A, 5B, 6A, 6B, 7A, 7B, 8A, and 8B, the inner posterior and anterior surfaces may be switched, such that the feedline segments extend along the inner anterior surfaces of the shells instead of the inner posterior surfaces of the shells. Furthermore, in the examples of FIG. 3A through FIG. 8B, the antennas may be constructed from one or more metallic strips. For example, the antennas may be constructed from copper with a protective polymer coating. The metallic strips may initially be flat and may be bend and folded during assembly of the hearing instruments. In some examples, the metallic strips may be formed using techniques, such as 3D printing, for forming electrical traces on the shells of the hearing instruments.

Figure 8B:
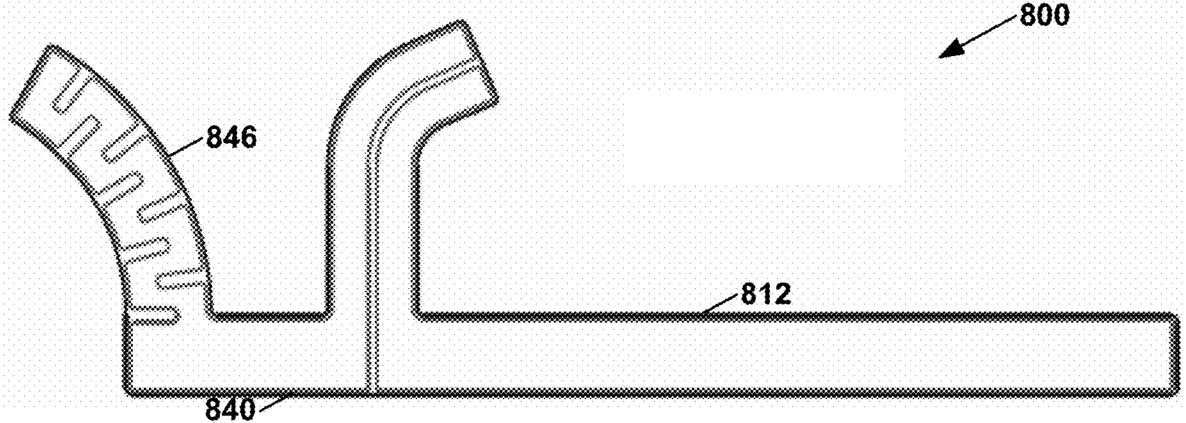
FIG. 8B is a conceptual diagram illustrating a version of the sixth example antenna of FIG. 8A when folded flat, in accordance with one or more aspects of this disclosure.

FIG. 8B is a conceptual diagram illustrating a version of the sixth example antenna 800 when folded flat, in accordance with one or more aspects of this disclosure. Parts of antenna 800 having corresponding parts in antenna 700 may have the same dimensions as shown in FIG. 7B and FIG. 7D.

Figure 9:
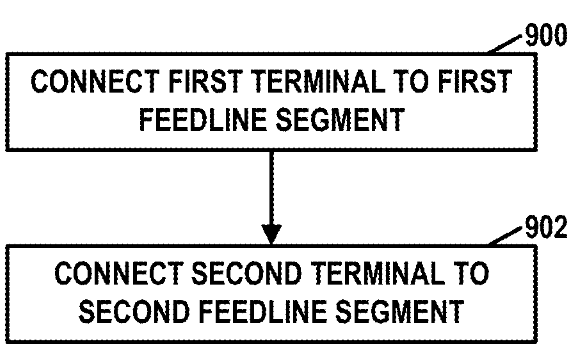
FIG. 9 is a flowchart illustrating an example method of manufacturing a hearing instrument, in accordance with one or more techniques of this disclosure.

FIG. 9 is a flowchart illustrating an example method of manufacturing a hearing instrument, in accordance with one or more techniques of this disclosure. Methods of manufacturing the hearing instrument (e.g., hearing instrument 102A, 102B) may include additional steps beyond those shown in the example of FIG. 9.

In the example of FIG. 9, a first terminal may be connected to a first feedline segment extending laterally along an inner lateral surface of a shell of the hearing instrument (900). The first terminal may be a terminal of a lead connected to one or more electronic components of the hearing instrument, such as a digital to analog converter, an amplification circuit, etc.

Furthermore, in the example of FIG. 9, a second terminal may be connected to a second feedline segment extending laterally along the inner lateral surface of the shell of the hearing instrument (902). The first terminal may be a terminal of a lead connected to one or more electronic components of the hearing instrument, such as a digital to analog converter, amplification circuit, etc. The antenna may be implemented in accordance with any of the examples provided in this disclosure. For instance, the antenna may comprise a first arm connected to the first feedline segment and initially extending in an inferior direction, along the inner lateral surface of the shell, from the first feedline segment. The antenna may also comprise a second arm connected to the second feedline segment and initially extending in a superior direction, along the inner lateral surface of the shell, from the second feedline segment.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. An antenna for an in-the-ear hearing instrument, wherein the antenna is connected to:

a first feedline segment extending laterally along an inner lateral surface of a shell of the hearing instrument, and a second feedline segment extending laterally along the inner lateral surface of the shell of the hearing instrument, and wherein the antenna comprises:

a first arm connected to the first feedline segment and initially extending in an inferior direction, along the inner lateral surface of the shell, from the first feedline segment; and a second arm connected to the second feedline segment and initially extending in a superior direction, along the inner lateral surface of the shell, from the second feedline segment, wherein the inner lateral surface is a first inner lateral surface of the shell, the first arm further includes a first lateral segment, an inferior segment, and a second lateral segment, the first lateral segment extends along the first inner lateral surface of the shell, the inferior segment of the first arm extends in a sagittal direction along an inner inferior surface of the shell, the second lateral segment of the first arm extends along a second inner lateral surface of the shell, the second arm comprises a lateral segment and a superior segment, wherein:

the superior segment of the second arm extends along an inner superior surface of the shell toward a medial end of the shell, and the lateral segment of the second arm is connected to a lateral end of the second feedline segment and extends from the lateral end of the second feedline segment in a superior direction along an inner posterior surface of the shell and the inner superior surface of the shell, wherein a superior end of the lateral segment of the second arm connects to a lateral end of the superior segment of the second arm.

2. The antenna of claim 1, wherein a width of the second lateral segment is greater in a middle portion of the second lateral segment than an inferior portion of the second lateral segment and a superior portion of the second lateral segment.

3. The antenna of claim 1, wherein:

the second lateral segment of the first arm has a first sub-arm, a second sub-arm, and a common section inferior to a meeting point of the first sub-arm and the second sub-arm, the first sub-arm extends in a superior direction from the meeting point along the second inner lateral surface of the shell, and the second sub-arm extends at least initially in a medial direction from the meeting point along the second inner lateral surface of the shell.

4. The antenna of claim 1, wherein the superior segment of the second arm is meandered.

5. The antenna of claim 4, wherein a level of meandering of the superior segment tunes the antenna to a specific frequency.

6. The antenna of claim 1, wherein the antenna is configured to operate in accordance with a Bluetooth™ Low Energy standard.

7. A hearing instrument comprising:

a shell;

a first feedline segment extending laterally along an inner lateral surface of the shell;

a second feedline segment extending laterally along the inner lateral surface of the shell; and an antenna that comprises:

a first arm connected to the first feedline segment and initially extending in an inferior direction, along the inner lateral surface of the shell, from the first feedline segment; and a second arm connected to the second feedline segment and initially extending in a superior direction, along the inner lateral surface of the shell, from the second feedline segment, wherein the inner lateral surface is a first inner lateral surface of the shell, the first arm further includes a first lateral segment, an inferior segment, and a second lateral segment, the first lateral segment extends along the first inner lateral surface of the shell, the inferior segment of the first arm extends in a sagittal direction along an inner inferior surface of the shell, the second lateral segment of the first arm extends along a second inner lateral surface of the shell, the second arm comprises a lateral segment and a superior segment, wherein:

the superior segment of the second arm extends along an inner superior surface of the shell toward a medial end of the shell, and the lateral segment of the second arm is connected to a lateral end of the second feedline segment and extends from the lateral end of the second feedline segment in a superior direction along an inner posterior surface of the shell and the inner superior surface of the shell, wherein a superior end of the lateral segment of the second arm connects to a lateral end of the superior segment of the second arm.

8. The hearing instrument of claim 7, wherein a width of the second lateral segment is greater in a middle portion of the second lateral segment than an inferior portion of the second lateral segment and a superior portion of the second lateral segment.

9. The hearing instrument of claim 7, wherein:

the second lateral segment of the first arm has a first sub-arm, a second sub-arm, and a common section inferior to a meeting point of the first sub-arm and the second sub-arm, the first sub-arm extends in a superior direction from the meeting point along the second inner lateral surface of the shell, and the second sub-arm extends at least initially in a medial direction from the meeting point along the second inner lateral surface of the shell.

10. The hearing instrument of claim 7, wherein the superior segment of the second arm is meandered.

11. The hearing instrument of claim 10, wherein a level of meandering of the superior segment tunes the antenna to a specific frequency.

12. The hearing instrument of claim 7, wherein the antenna is configured to operate in accordance with a Bluetooth™ Low Energy standard.

* * * * *